US012800070B2

(12) United States Patent
Zhang et al.

(10) Patent No.: US 12,800,070 B2
(45) Date of Patent: Nov. 17, 2026

(54) MULTILAYERED PLASTIC THERMAL MANAGEMENT TUBE SUCH AS FOR AUTOMOTIVE APPLICATION

(71) Applicant: Martinrea International US Inc., Auburn Hills, MI (US)

(72) Inventors: Cong Zhang, Auburn Hills, MI (US); Murali Chandrasekhar, Rochester, MI (US); Cory Doble, Ortonville, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 485 days.

(21) Appl. No.: 18/237,500

(22) Filed: Aug. 24, 2023

(65) Prior Publication Data

US 2024/0068602 A1 Feb. 29, 2024

Related U.S. Application Data

(60) Provisional application No. 63/401,265, filed on Aug. 26, 2022, provisional application No. 63/467,742, filed on May 19, 2023.

(51) Int. Cl.

*F16L 11/04* (2006.01)
*B29C 48/00* (2019.01)

(Continued)

(52) U.S. Cl.

CPC .............. *F16L 11/04* (2013.01); *B29C 48/21* (2019.02); *B32B 1/08* (2013.01); *B32B 7/12* (2013.01);

(Continued)

(58) Field of Classification Search

CPC ....... B29C 48/022; B29C 48/09; B29C 48/10; B29C 48/21; B29L 2023/005;

(Continued)

(56) References Cited

U.S. PATENT DOCUMENTS

| | | | |
|---|---|---|---|
| 5,850,855 | A | 12/1998 | Kerschbaumer et al. |
| 6,581,643 | B2 | 6/2003 | Guippe et al. |

(Continued)

FOREIGN PATENT DOCUMENTS

| | | | |
|---|---|---|---|
| CN | 114213750 | A | 3/2022 |
| DE | 102017115937 | A1 | 1/2019 |

(Continued)

OTHER PUBLICATIONS

International Search Report and Written Opinion for Application No. PCT/US2023/072890 mailed Nov. 14, 2023, 15 pages.

*Primary Examiner* — William M McCalister
(74) *Attorney, Agent, or Firm* — Dinsmore & Shohl LLP

(57) ABSTRACT

The present invention discloses two multilayer coolant fluid transport tube constructions, a three-layer and a two-layer design, produced by a melt co-extrusion process for electric vehicle thermal management applications. The three-layer coolant fluid transport tube presented in this invention was designed for a maximum continuous use temperature of 125 degrees Celsius, comprising a polyamide jacket, a middle adhesive layer and an impact modified polypropylene copolymer inner layer. Also presented in this invention is a two-layer coolant fluid transport tube with a maximum continuous use temperature of 105 degrees Celsius, which incorporates a polypropylene copolymer inner layer and a thermoplastic vulcanizate outer layer.

9 Claims, 1 Drawing Sheet

(51) Int. Cl.

| | |
|---|---|
| ***B29C 48/10*** | (2019.01) |
| ***B29C 48/21*** | (2019.01) |
| ***B29L 23/00*** | (2006.01) |
| ***B32B 1/08*** | (2006.01) |
| ***B32B 7/12*** | (2006.01) |
| ***B32B 27/08*** | (2006.01) |
| ***B32B 27/20*** | (2006.01) |
| ***B32B 27/32*** | (2006.01) |

(52) U.S. Cl.

CPC .............. *B32B 27/08* (2013.01); *B32B 27/20* (2013.01); *B32B 27/32* (2013.01); *B29C 48/022* (2019.02); *B29C 48/10* (2019.02); *B29L 2023/005* (2013.01); *B32B 2250/02* (2013.01); *B32B 2250/242* (2013.01); *B32B 2264/108* (2013.01); *B32B 2597/00* (2013.01)

(58) Field of Classification Search

CPC .... B29L 2023/22; B29L 2031/30; B32B 1/08; B32B 7/12; B32B 25/08; B32B 25/14; B32B 25/16; B32B 27/08; B32B 27/18; B32B 27/02; B32B 27/32; B32B 27/34; B32B 2250/02; B32B 2250/03; B32B 2250/24; B32B 2250/242; B32B 2264/108; B32B 2270/00; B32B 2274/00; B32B 2307/308; B32B 2307/51; B32B 2307/714; B32B 2307/7265; B32B 2597/00; C08L 77/00; F16L 11/04; F16L 11/127

See application file for complete search history.

(56) References Cited

U.S. PATENT DOCUMENTS

| | | | | |
|---|---|---|---|---|
| 7,579,058 | B2 * | 8/2009 | Dowe | B32B 27/34 428/34.1 |
| 7,939,151 | B2 * | 5/2011 | Kuhmann | F16L 11/04 428/34.7 |
| 8,357,455 | B2 * | 1/2013 | Baumann | A63C 5/124 528/367 |
| 8,470,433 | B2 * | 6/2013 | Haeger | B32B 27/34 428/212 |
| 8,614,005 | B2 * | 12/2013 | Wursche | C08L 77/06 428/615 |
| 8,739,836 | B2 * | 6/2014 | Oyaizu | F16L 11/04 138/146 |
| 10,843,432 | B2 | 11/2020 | Na et al. | |
| 10,960,635 | B1 * | 3/2021 | Tsuboi | B32B 27/34 |
| 11,092,263 | B2 | 8/2021 | Saint-Lary et al. | |
| 11,655,920 | B2 * | 5/2023 | Schramowski | B32B 27/34 138/137 |
| 2005/0131147 | A1 | 6/2005 | Brule | |
| 2007/0148388 | A1 | 6/2007 | Kuhmann | |
| 2010/0055367 | A1 | 3/2010 | Ohigawa | |
| 2010/0159178 | A1 | 6/2010 | Seboe et al. | |
| 2020/0198203 | A1 | 6/2020 | Caviezel | |
| 2022/0097276 | A1 | 3/2022 | Nie et al. | |
| 2022/0196188 | A1 | 6/2022 | Banerji | |
| 2022/0268376 | A1 | 8/2022 | Häckel | |

FOREIGN PATENT DOCUMENTS

| | | | |
|---|---|---|---|
| JP | 2020513516 | A | 5/2020 |
| WO | 2001042005 | A1 | 6/2001 |
| WO | 2019122184 | A1 | 6/2019 |
| WO | 2021148989 | A1 | 7/2021 |

* cited by examiner

MULTILAYERED PLASTIC THERMAL MANAGEMENT TUBE SUCH AS FOR AUTOMOTIVE APPLICATION

CROSS REFERENCE TO RELATED APPLICATIONS

The present application claims the priority of U.S. Ser. No. 63/401,265 filed Aug. 26, 2022. The present application also claims the priority of U.S. Ser. No. 63/467,742 filed May 19, 2023.

FIELD OF THE INVENTION

The present invention relates generally to plastic extrusion processes. More specifically, the present invention teaches two novel thermal management multilayer tube constructions for electric vehicle use, including a three-layer and a two-layer construction. The three-layer thermal management tube presented in this invention was designed for a maximum continuous use temperature of 125 degrees Celsius, comprising a polyamide jacket, a middle tie layer and a polypropylene inner layer. The present invention additionally teaches a two-layer thermal management tube with a maximum continuous use temperature of 105 degrees Celsius, which incorporates a polypropylene copolymer inner layer and a thermoplastic vulcanizate outer layer.

BACKGROUND OF THE INVENTION

Electric vehicles have been an unstoppable change in the automotive industry. With the advancement of electric vehicle batteries study, batteries were found to have a sweet spot on the operation temperature between 15 to 35 degrees Celsius to reach their best performance and elongate their lifetime. An efficient cooling system to remove excessive heat is the key to keep batteries at their comfort zone. Among all cooling systems, fluid cooling through a tube system, demonstrated its advantages of high heat capacity and high efficiency, has been widely adopted as the dominant cooling resolution in the EV industry.

Coolant tubes serve as a coolant transportation carrier in the cooling system. Certain material properties are required to meet its function role in such a complex working environment in an electric vehicle. This complex working environment, e.g. high and low temperature, various pressure and chemical exposure, requires coolant transport tubes to resist heat from batteries and weather, to be cold impact resistance in wintertime, to be compatible with coolant fluid, engine oil and brake fluid, to withstand high working pressure, to be flexible, to ease assembly process and to have a water barrier to prevent water escape from the coolant fluid. Fulfilling these various requirements through the use of a single material tube has been found to be a challenge. As a consequence, multiple materials have been used in a single tube to provide a commercial advantage as well as to fulfill the functional requirements.

Examples of fluid coolant tubing drawn from the prior art include U.S. Pat. No. 7,939,151 to Kuhmann (Evonik) which teaches a coolant line having an outer layer including a molded polyamide (such as PA612) composition and an inner layer including a polypropylene and at least 0.02% by weight of a heat stabilizer. The coolant line is further disclosed as having a high thermal aging resistance and bursting strength.

Other examples include the fluid transport pipe of Caviezel US 2020/0198203 which has an inner layer in contact with a fluid, and including at least one aliphatic polyamide and at least one impact modifier. At least one outer layer is formed from an aliphatic polyamide comprising least one flame retardant additive. While the inner layer ensures the chemical resistance relative to the fluids to be transported and the mechanical resistance, the flame resistance is ensured by the outer layer.

Saint-Laury, U.S. Pat. No. 11,092,263, teaches a cooling fluid flow pipe, such as an engine cooling fluid pipe, having a single layer made of a polymer material including a mixture of at least two polymer materials. The first material includes a polyolefin, with the second material being a thermoplastic polymer elastomer (TPE).

Finally, Seboe US 2010/0159178 teaches a motor vehicle fluid line having a syndiotactic polystyrene in combination with at least a further plastic surrounding an interior thereof.

SUMMARY OF THE INVENTION

The present invention discloses two multilayer coolant fluid transport tube designs with different materials, construction and target working conditions. The terminology provided herein also is interpreted to cover a suitable multi-layer thermal coolant tube and polypropylene/thermal plastic vulcanizate tube including any multi-layer configuration.

The invention discloses a three-layer coolant fluid transport tube including a circular cross-sectional shape and a flexible body having an innermost fluid contact layer, a middle adhesive layer and an outermost supporting layer. The innermost layer incorporates an isotactic polypropylene homopolymer and an ethylene-propylene copolymer material. The middle adhesive layer incorporates an anhydride modified polypropylene layer. The outer supporting layer incorporates a polyamide material with an impact modifier, in addition to any of a PA12, PA11, PA10, PA6, PA610, PA1012, PA612 material. The innermost and outermost layers can either or both further include a Graphene or Graphene derivative material, such as in one non-limiting example being in a range of 0.01-50% by weight without limitation. The construction was designed to target a continuous working temperature of 125 degrees Celsius or lower. The material construction can also be applied for any of smooth wall or corrugated wall tubes. The three-layer tube of the present invention is further produced by a melt co-extrusion process, where all layers are extruded simultaneously.

In an additional embodiment, the invention discloses a two-layer coolant fluid transport tube with 105 degree Celsius continuous working temperature or lower. The tube includes an inner polyolefin layer not limited to a heterophasic polypropylene copolymer and a thermo-plastic vulcanizate outer layer. In operation, the tube shows excellent water barrier, low temperature impact resistance, flexibility and low cost.

Other features include the inner polyolefin layer being further provided as an isotactic polypropylene as a primary phase and an ethylene-propylene copolymer as a secondary phase. The inner polyolefin layer may contain Graphene or Graphene derivative provided in a range of 0.01-50% by weight.

The thermoplastic vulcanizate or TPV layer further includes a polypropylene as a primary phase and an elastomeric secondary phase, this further including a cross-linked ethylene propylene diene monomer. The outer layer may contain Graphene or Graphene derivative provided in a range of 0.01-50% by weight. The two-layer tube of the present invention is further produced by a melt co-extrusion process, where all layers are extruded simultaneously.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
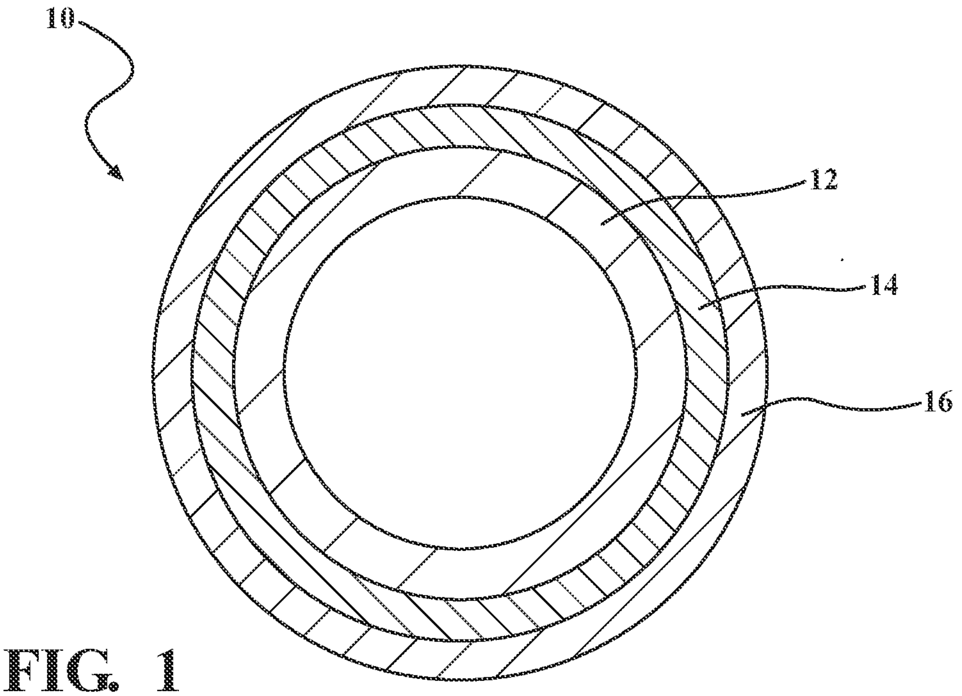
FIG. 1 is a cross sectional cutaway illustration of a flexible fluid coolant tube according to a non-limiting embodiment of the present invention.

With reference to FIG. 1, the present invention discloses a coolant transport tube, see as generally shown at 10, including a circular cross-sectional shape and a flexible body having an innermost fluid contact layer 12, a middle adhesive layer 14 and an outermost supporting layer 16.

The innermost layer 12 incorporates an isotactic polypropylene homopolymer and an ethylene-propylene copolymer material. The middle adhesive layer further incorporates an anhydride modified polypropylene layer. The outer supporting layer incorporates a polyamide material and an impact modifier, including any of a PA12, PA11, PA10, PA6, PA610, PA1012, or PA612 material. The innermost and outermost layers can either or both further include up to 0.01-50% by weight of Graphene or Graphene derivative material.

Figure 2:
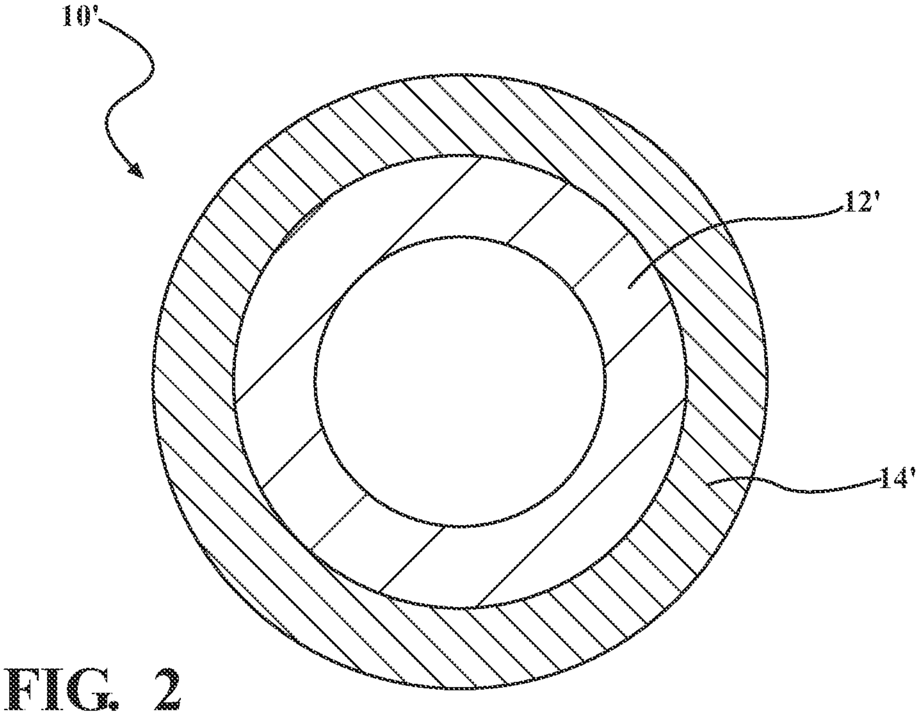
FIG. 2 is a cross section of a coolant transportation tube according to a further non-limiting variant of the present invention and including a polypropylene or copolymer, along with a thermoplastic vulcanizate outer layer.

With reference to FIG. 2, the present invention discloses a coolant transportation tube for a vehicle. More specifically, the present invention teaches a low cost and flexible EV coolant line conduit which incorporates a polypropylene copolymer inner layer and a thermoplastic vulcanizate outer layer providing effective water barrier properties, along with low temperature impact resistance, flexibility and low cost.

FIG. 2 presents a cross section, generally at 10', of a coolant transportation tube according to a further non-limiting variant of the present invention and which includes an inner polyolefin layer 12', not limited to a heterophasic polypropylene copolymer, along with a thermoplastic vulcanizate (TPV) outer layer 14'.

Other features include the inner polyolefin layer 12' being further provided as an isotactic polypropylene as a primary phase and an ethylene-propylene copolymer as a secondary phase. The inner polyolefin layer 12' may contain Graphene-derivatives 0.05-50% by weight.

The group of Graphene-derivatives may again include, but are not limited to, any of a monolayer Graphene, few layered Graphene, Graphene oxide, reduced Graphene oxide, and functionalized Graphene.

The thermoplastic vulcanizate or TPV layer 14' further includes a polypropylene as a primary phase and an elastomeric secondary phase, this further including a cross-linked ethylene propylene diene monomer. Without limitation, the two-layer tube of the present invention can be further produced by a melt co-extrusion process, where all layers are extruded simultaneously.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as “including”, “comprising”, “incorporating”, “consisting of”, “have”, “is” used to describe, and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader’s understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, “first”, “second”, “third”, “primary”, “secondary”, “main” or any other ordinary and/or numerical terms, should also be taken only as identifiers, to assist the reader’s understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A multi-layer coolant fluid transport tube, comprising:

a coextruded body of an inner polyolefin further including a polypropylene layer incorporating a Graphene or Graphene derivative and an outer layer containing a thermoplastic vulcanizate;

said outer thermoplastic vulcanizate layer further including a polypropylene as a primary phase, an elastomeric secondary phase further including a cross-linked ethylene propylene diene monomer.

2. The coolant tube of claim 1, said polypropylene of said inner polyolefin layer further comprising a heterophasic polypropylene copolymer.

3. The coolant tube of claim 2, said heterophasic polypropylene copolymer further comprising an isotactic polypropylene as a primary phase and an ethylene-propylene copolymer as a secondary phase.

4. The coolant tube of claim 1, said Graphene or Graphene derivative further comprising 0.01-50% by weight of said inner polyolefin layer.

5. The coolant tube of claim 1, said Graphene or Graphene derivative further comprising any of a Graphene, monolayer Graphene, few layered Graphene, Graphene oxide, reduced Graphene oxide, and functionalized Graphene.

6. The coolant tube of claim 1, further comprising said inner and outer layers being extruded simultaneously.

7. The coolant tube of claim 1, further comprising a middle adhesive layer positioned between said inner and outer layers.

8. The coolant tube of claim 7, said middle adhesive layer further comprising an anhydride modified polypropylene layer.

9. The coolant tube of claim 7, further comprising said inner, middle adhesive and outer layers being extruded simultaneously.

* * * * *